Jan. 20, 1953            J. FRENCH            2,626,110
CONSTANT SPEED CONTROL FOR STRIP ANNEALING
Filed Jan. 15, 1948            5 Sheets-Sheet 1
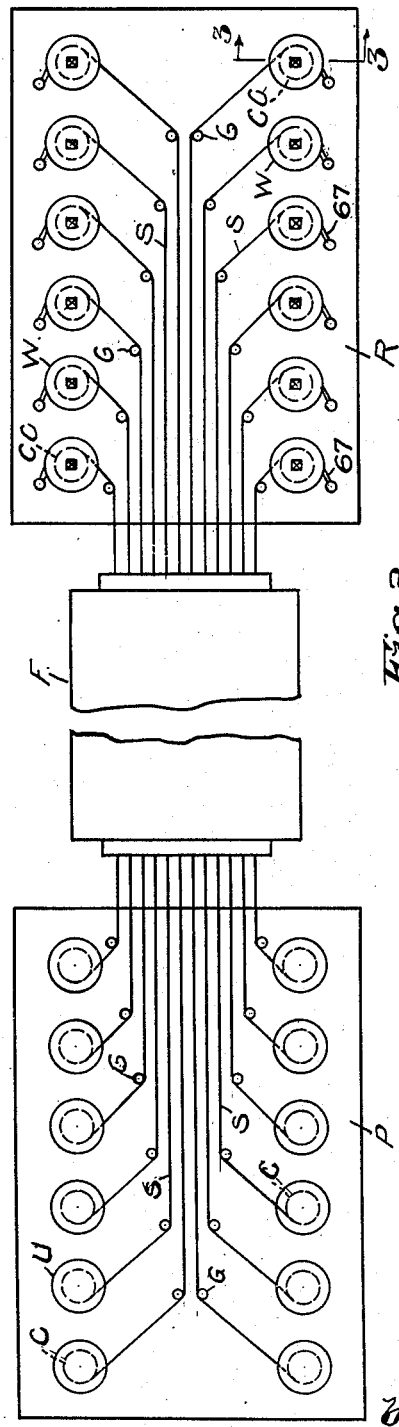
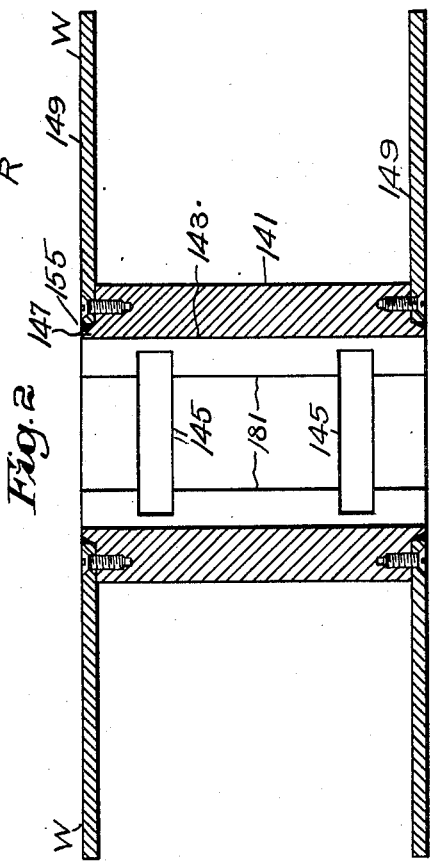
Inventor:
John French

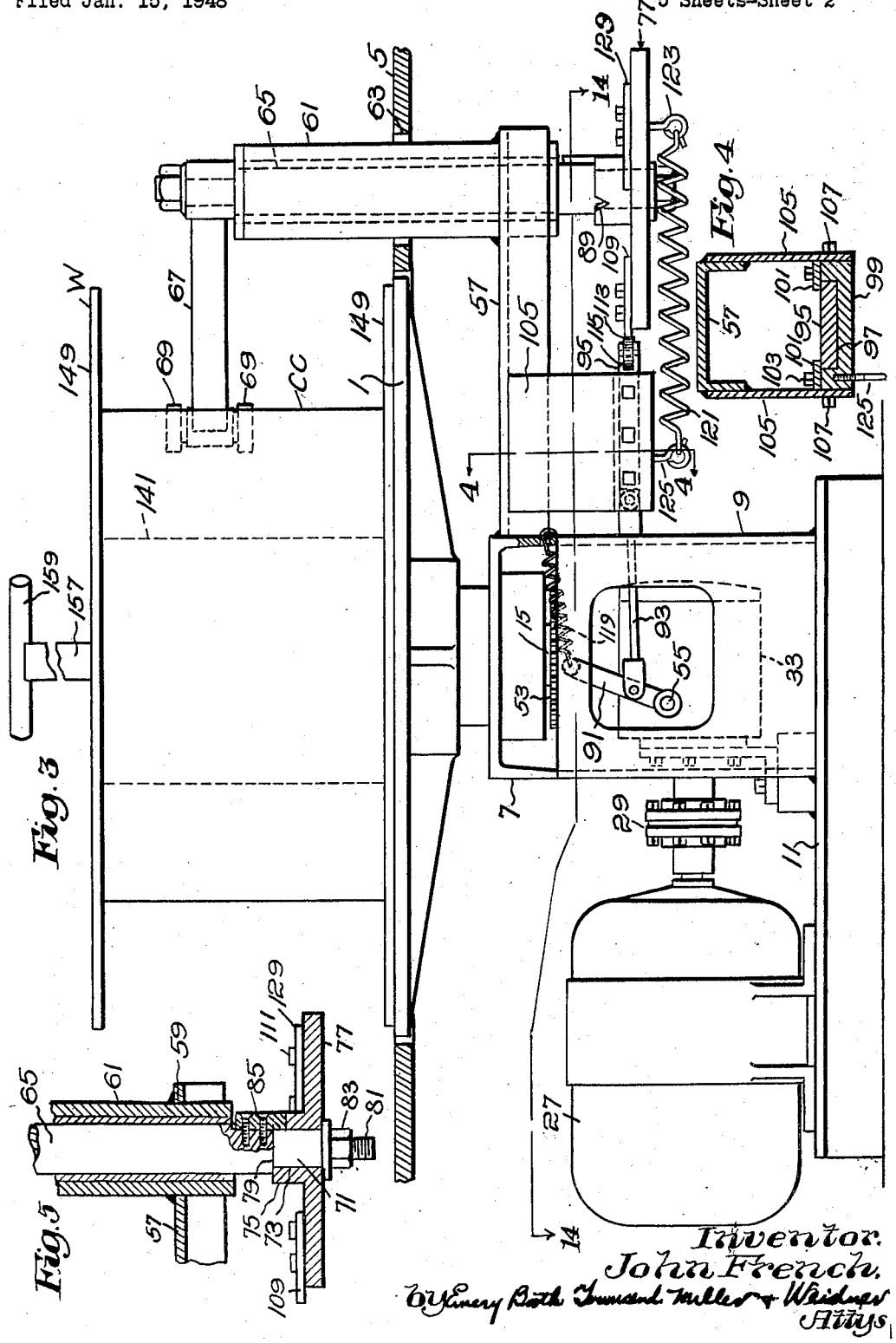

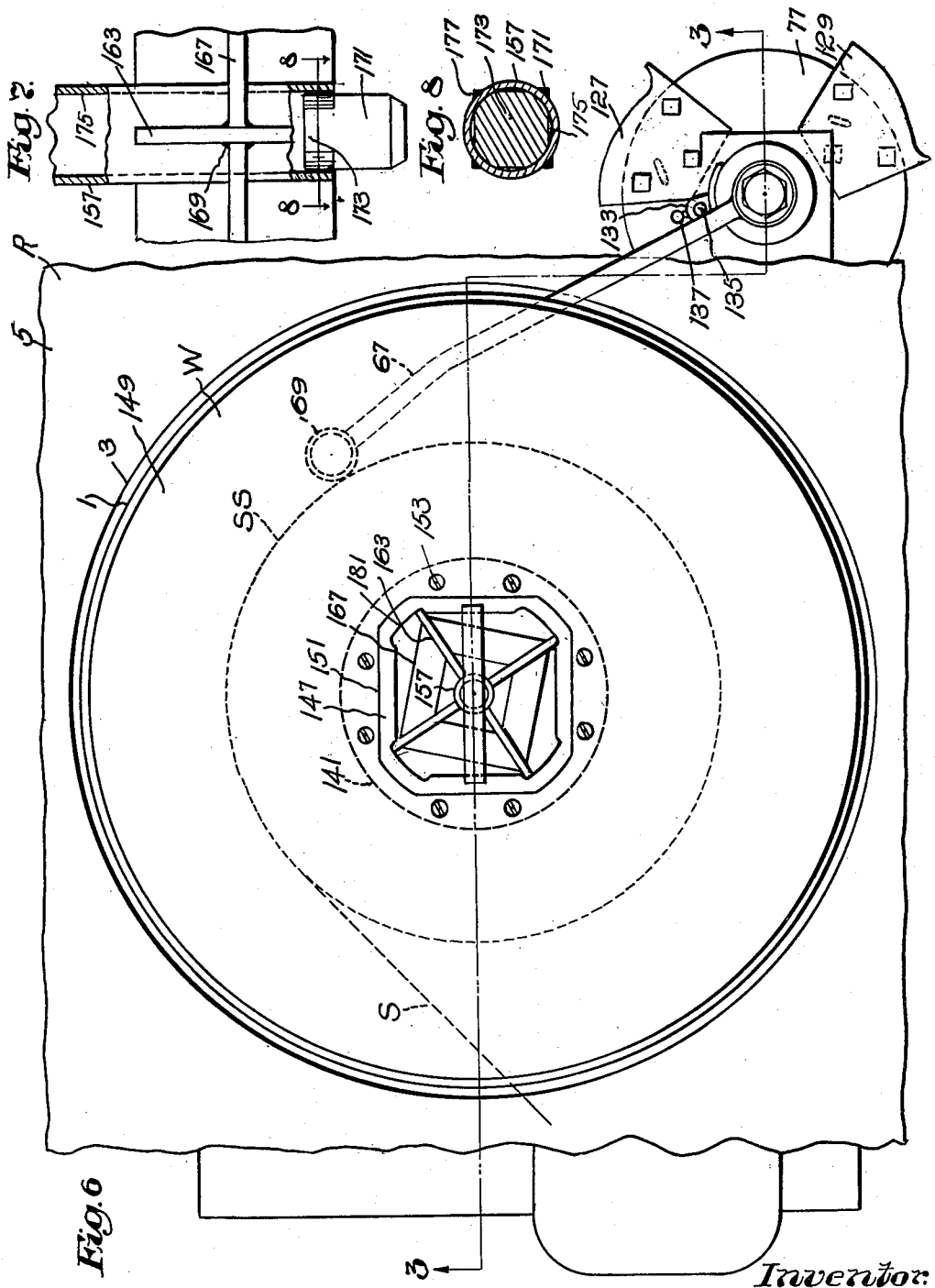

Jan. 20, 1953 J. FRENCH 2,626,110
CONSTANT SPEED CONTROL FOR STRIP ANNEALING
Filed Jan. 15, 1948 5 Sheets-Sheet 4
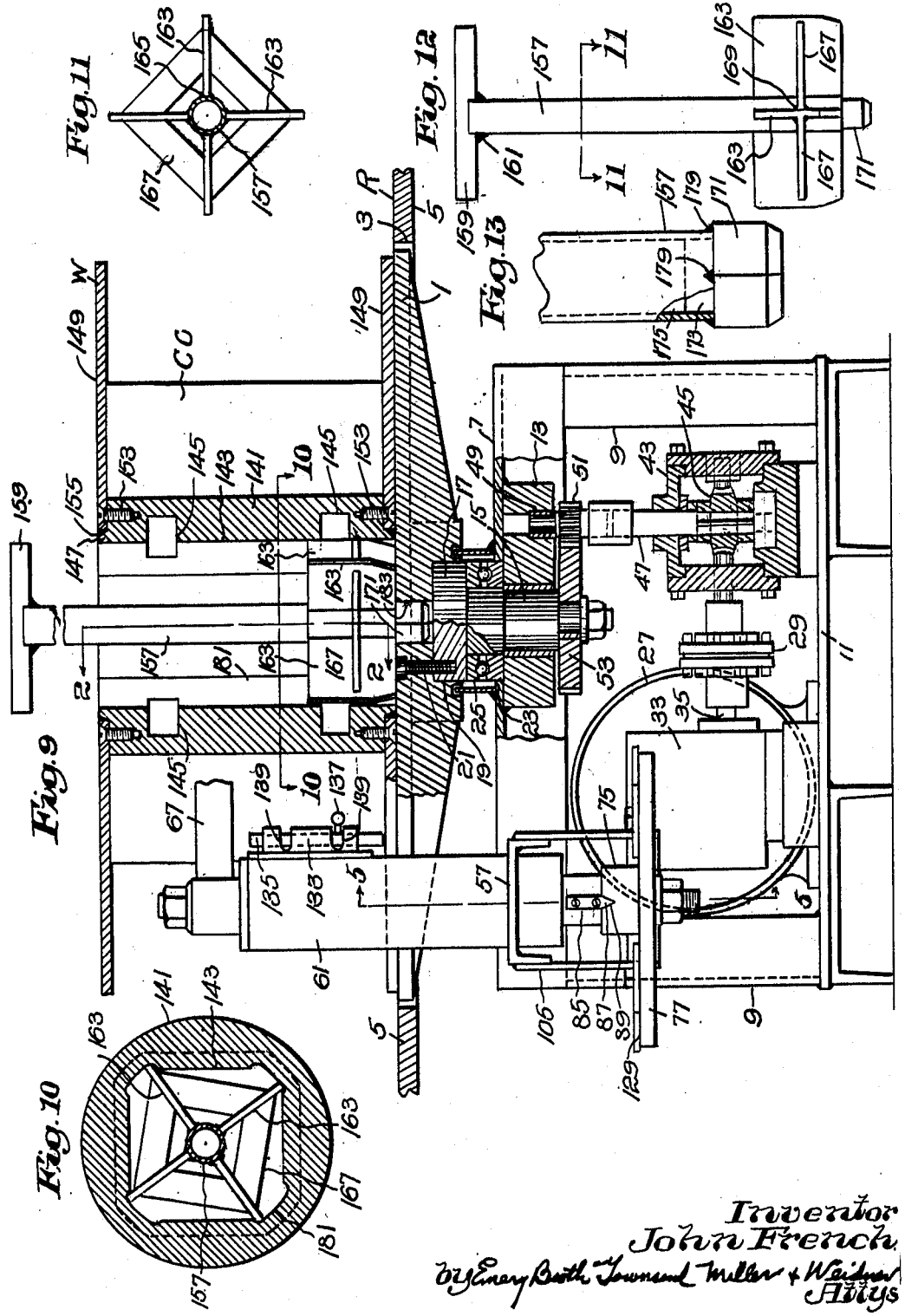
Inventor
John French
by Emery Booth Townsend Miller & Weidner
Attys

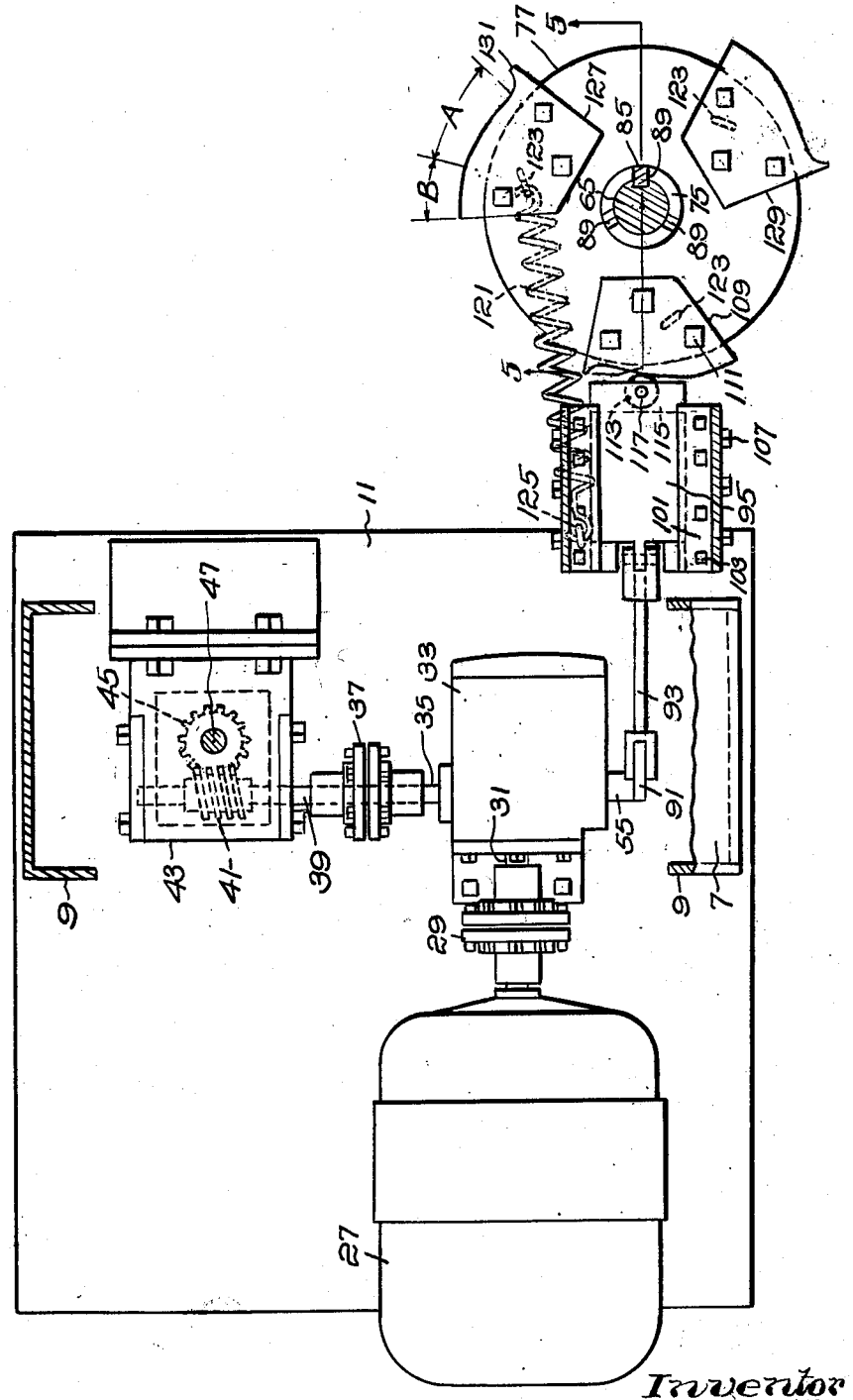

Patented Jan. 20, 1953

2,626,110

UNITED STATES PATENT OFFICE 2,626,110

CONSTANT SPEED CONTROL FOR STRIP ANNEALING

John French, Ecorse, Mich., assignor to Revere Copper and Brass Incorporated, New York, N. Y., a corporation of Maryland Application January 15, 1948, Serial No. 2,404

1 Claim. (Cl. 242—75)

My invention relates to apparatus for annealing and determining the grain size of metallic strip, and constitutes an improvement in the apparatus forming the subject matter of pending John French application Serial Number 745,873, filed May 3, 1947, now Patent No. 2,535,983. Particularly the present invention is concerned with improved reeling mechanism for drawing the strip at a constant linear speed through the furnace of such apparatus.

The invention will be best understood from the following description when read in the light of the accompanying drawings of a specific embodiment thereof selected for illustrative purposes, the scope of the invention being more particularly pointed out in the appended claim.

In the drawings:

Fig. 1 is a more or less diagrammatic plan view of apparatus according to the invention;

Fig. 2 is a section through the reel on the line 2—2 of Fig. 9;

Fig. 3 is an elevation of the reeling mechanism on the line 3—3 of Fig. 6, with parts in elevation, this section line being also applied to Fig. 1 for convenience in following the drawings;

Fig. 4 is a section on the line 4—4 of Fig. 3, with parts omitted;

Fig. 5 is a section on the line 5—5 of Fig. 14, with parts omitted, this section line being also applied to Fig. 9 for convenience in following the drawings;

Fig. 6 is a plan of the mechanism according to Fig. 3;

Fig. 7 is a fragmentary view, with parts in section and parts broken away, of the lower portion of the instrument according to Figs. 11 and 12 for detachably rotatably securing the reel to the rotary reel supporting table;

Fig. 8 is a section on the line 8—8 of Fig. 7, with parts omitted;

Fig. 9 is an elevation of the reeling mechanism as viewed from the right of Figs. 6 and 14, with parts in section and parts broken away;

Fig. 10 is a section on the line 10—10 of Fig. 9, with parts omitted;

Fig. 11 is a section on the line 11—11 of Fig. 12;

Fig. 12 is an elevation of the instrument for detachably rotatably securing the reel to the rotary reel supporting table;

Fig. 13 is an elevation showing a detail of a portion of the lower end of the instrument according to Fig. 12; and Fig. 14 is a section on the line 14—14 of Fig. 3.

In common with the apparatus described by the above mentioned pending application, coils C (Fig. 1) of metallic strip S are unwound from reels U at a pay-off platform or station P and are rewound on reels W into coils CC at a rewinding platform or station R, the length of the strip between the coils passing through a heat treating furnace F for annealing the strip and giving it the desired grain size. The coils C and CC are positioned at the platforms P and R with their axes vertical so that the strips pass through the furnace F on edge. By passing the strips about vertical guide rollers G at the pay-off and rewinding platforms the portions of the strips passing through the furnace may be maintained in relatively closely spaced relation. The furnace F may be that described in said pending application, and the strip may be handled and the apparatus operated in the way described in that application.

Referring to the drawings, each reel W at the rewinding platform R is supported on a circular rotary table 1 (Figs. 6 and 9) received in a circular opening 3 formed in the plate 5 constituting the platform top. Beneath the platform top is positioned a frame comprising an upper horizontal inverted channel-iron 7 (Fig. 3 and 9) supported at each of opposite ends by a post 9. These posts, which are constituted by lengths of channel-irons, at their lower ends rest upon a plate 11 forming part of a supporting base structure, the posts 9 being welded at their opposite ends to the plate 11 and the side flanges of the channel-irons 7, respectively.

Welded to the lower side of the web of the channel-iron 7 is shown a bearing block 13 (Fig. 9) in which is rotatably supported a vertical shaft 15 having an upper enlarged diameter portion 17. This portion 17 of the shaft is removably received within a circular recess 19 in the lower portion of the rotary table 1, the table being secured to this portion by a removable bolt 21 so that when the shaft is rotated the table must rotate with it. The web of the channel-iron 7 is shown as formed with an opening 23 (Fig. 9) through which the shaft 15 extends. Received in this opening, and resting upon the upper surface of the bearing block 13, is an anti-friction thrust bearing 25 cooperating with the enlarged diameter portion 17 of the shaft so that the table is supported upon the bearing block.

As shown, the shaft 15 and rotary table 1 are driven by an electric motor 27 carried by the plate 11. This motor is shown as connected through a coupling 29 to the input or driving shaft 31 (Fig. 14) of a fluid transmission the casing of which is shown at 33 also supported upon the plate 11. The output or driven shaft 35 of the fluid transmission is shown as connected through a coupling 37 to a shaft 39 which drives a worm 41 contained in a casing 43, which casing likewise is supported upon the plate 11. Within this casing is a wormwheel 45 meshing with the worm 41 so as to be driven thereby. The wormwheel is shown as fixedly carried by a vertical shaft 47 (Fig. 9) which extends upwardly from the casing 43 and at its upper end is journalled in a bearing 49 carried by the bearing block 13. The shaft 47 at its upper end fixedly carries a spur pinion 51 which meshes with a spur gear 53 fixedly carried at the lower end of the shaft 15. Thus when the motor 27 is set in operation the rotary table 1 will be driven at a slow rate of speed through the reduction gearing afforded by the fluid transmission, the worm and wormwheel, and the pinion and spur gear.

The fluid transmission employed may be of the common type having a variable displacement oil pump of the expansible chamber type, which pump places the oil under pressure and supplies it to the inlet of a motor also of the expansible chamber type, the discharge of the motor being connected to the inlet of the pump so that the oil circulates in a closed circuit through the pump and motor. The pump and motor commonly are positioned in a single housing from which extends the control member of mechanism for adjusting the displacement of the pump so that the speed of the motor may be adjusted by operation of said control member. As fluid transmissions of this and other types constitute well known articles of commerce, and the details thereof form no part of the present invention, such transmission will not be described with any more particularity than necessary to explain how it coacts with other elements of the improved apparatus constituting applicant's invention.

The electric motor employed is preferably one of the substantially constant speed type as, for example, a synchronous or other A. C. motor or a suitably wound D. C. motor, so that the speed of the rotary table 1 may be varied by adjustment of the output speed of the fluid transmission.

In the mechanism above described the pump and motor of the fluid transmission are contained in the casing 33, the shaft 31 driven by the electric motor 27 being the fluid transmission input shaft which drives the oil pump, and the shaft 35 being the fluid transmission output shaft driven by the motor of the fluid transmission, while extending from the casing is an oscillatory shaft 55 constituting the control member for operating that mechanism of the fluid transmission which adjusts the displacement of the oil pump, so that by turning the shaft 55 into different positions of adjustment the speed of the output shaft 35 may be varied while the speed of the electric motor 27 remains constant.

It will be observed that to cause the reel W to draw the strip through the furnace F at a constant linear speed the speed of rotation of the table 1 which rotates the reel must be progressively decreased as the diameter of the coil increases. For securing this result in the present invention means are provided for progressively adjusting the control member 55 of the fluid transmission to cause the speed of the output shaft 35 of that transmission progressively to decrease as the diameter of the coil builds up, and at such rate that the linear speed at which the strip is drawn through the furnace will remain substantially constant.

As shown, extending from one of the flanges of the channel-iron 7 is a smaller channel-iron 57 (Fig. 3) secured at one end to said flange by welding. At its opposite end the web of the channel-iron 57 is shown as formed with an opening 59 (Fig. 5) which receives the lower end portion of a vertical sleeve 61. This sleeve, which is secured to said web by welding, extends upwardly through an opening 63 (Fig. 3) in the platform top 5 to the upper side of the latter. Journalled in the sleeve is an oscillatory vertical shaft 65 which at its upper end fixedly carries a swinging arm 67. The outer end of the arm carries rollers 69 which bear against the outer side of the coil CC being wound on the reel W so that as the diameter of the coil progressively increases the arm will be progressively swung to the right as viewed in Fig. 6. As illustrated, the lower end of the oscillatory shaft 65 has a reduced diameter portion 71 (Fig. 5) which is received in the bore 73 of the centrally positioned hub portion 75 of a disk 77, the hub portion at its upper end resting against the shoulder 79 on the shaft formed by the reduced diameter portion 71 thereof. At its lower end the shaft 65 is shown as formed with a further reduced diameter portion 81 which is screw-threaded and on which is removably screw-threaded a nut 83 for removably securing the disk to the shaft. As shown, fixedly secured to the shaft adjacent the hub 75 of the disk 77 is a key 85 the lower end 87 (Fig. 9) of which is of V-shape and is adapted to fit into any one of a plurality of V-shaped notches 89 (Figs. 3, 9 and 14) formed in the upper edge of the hub portion 75 of the disk 77 so that the disk may be fixedly secured to the shaft in any one of a plurality of selected positions angularly of the shaft.

As illustrated, the control member 55 of the fluid transmission at its outer end fixedly carries a lever 91 (Figs. 3 and 14) which at an intermediate portion of its length is connected by a link 93 to a slide 95. As best illustrated by Figs. 3, 4 and 14, the slide 95 is supported for longitudinal movement in a longitudinally extending recess 97 in a guide block 99, being retained in said recess by strips 101 secured to the guide block by bolts 103. As shown, the guide block 99 is rigidly supported from the channel-iron 57 by plates 105 secured adjacent their upper edges to the flanges of said channel-iron by welding and adjacent their lower edges being secured to the guide block by bolts 107.

Provision is made for causing the slide 95 to be moved to the left, as viewed in Figs. 3 and 14, as the diameter of the coil being wound increases, so as to swing the fluid transmission control lever 91 to the left, as viewed in those figures, for so adjusting the output speed of the transmission that the speed of rotation of the reel will be gradually decreased as the diameter of the coil being wound increases. Preferably this is accomplished by use of a cam device comprising a cam element and a cooperating cam follower element, one of which is carried by the slide 95 and the other by the oscillatory disk 77. Preferably, and as illustrated, the cam element is carried by the disk and the cam follower element by the slide.

As illustrated, the cam element above mentioned takes the form of a cam plate 109 removably secured by bolts 111 to the upper side of the disk 77, upon which latter the cam plate rests. The cam follower element is constituted by a roller 113 positioned in a slot 115 extending across the slide for its entire width, the roller being journalled on a pin 117 carried by the slide. As shown, the roller is held at all times against the cam by a tension spring 119 (Fig. 3) secured at one end to the upper end of the lever 91 and at its other end to one of the flanges of the channel-iron 7, while the rollers 69 on the swinging arm 67 are held at all times against the coil as it is being wound by a tension spring 121 (Figs 3 and 14) secured at one end to an eye 123 carried by and projecting from the under side of the disk 77 and at its opposite end to an eye 125 secured to and projecting downwardly from the guide block 99.

Besides the cam plate 109 the disk 77, as illustrated, carries two further cam plates 127 and 129. Each of the three cam plates is of generally similar shape, but are so designed and positioned, relative to the axis of the disk 77, that when brought into cooperation with the cam roller 113 each will maintain a different constant linear speed of the strip as the latter is being drawn through the furnace. The cam face of each cam plate comprises an arcuate portion A which progressively pushes the slide 95 to the left, as viewed in Fig. 14, as the disk 77 is rotated clockwise, as viewed in that figure, by reason of the building up of the coil. Also each cam face comprises an arcuate portion B, concentric with the axis of the disk 77, for maintaining the contact between the cam plate and the roller 113 when the arm 67 is swung to the right far enough, as viewed in Fig. 6, to permit the reel to be lifted from the rotary table 1. At its opposite end each cam face is formed to provide a stop 131 for preventing the cam plate from moving out of cooperation with the roller 113 when a reel is not on the table 1. The "low point" on the arcuate portion A of each cam face is preferably so positioned as to take care of reels having arbors of minimum diameter, while the "high point" on this arcuate portion is so positioned as to take care of the maximum diameter of coil being wound. The cam face of the cam plate 109 is so shaped and positioned as to give say the maximum constant linear speed at which the strip will be drawn through the furnace, say a speed of 20 feet per minute, corresponding to a maximum speed of rotation of the reel of about 7.6 R. P. M. if the diameter of its arbor is say 10 inches, and a minimum speed of rotation of the reel of about 2.5 R. P. M. if the maximum diameter of the coil being wound is say 30 inches. The cam face of the cam plate 127 may be so shaped and positioned as to secure a slower constant linear speed of drawing the strip through the furnace, say a speed of 15 feet per minute, corresponding to a maximum speed of rotation of the reel under the above conditions of about 5.7 R. P. M. and a minimum speed of rotation of about 1.9 R. P. M. The cam face of the cam plate 129 may be so shaped and positioned as to secure a still slower constant linear speed of drawing the strip through the furnace, say a speed of 10 feet per minute, corresponding under these same conditions to a maximum speed of rotation of the reel of about 3.8 R. P. M. and a minimum speed of rotation of about 1.3 R. P. M. As above explained, any one of the cam plates, to the exclusion of the others, may be brought into cooperation with the roller 113 by backing off the nut 83 (Fig. 5) and turning the cam disk relative to the shaft 65 to bring the V-shaped end of the key 85 into cooperation with the proper notch 89 on the hub portion 75 of the disk 77. As shown (Fig. 14), three eyebolts 123 are provided so as to provide an eyebolt through which the end of the spring 121 may be hooked regardless of the angular adjustment of the disk 77 relative to the shaft 65.

For holding the cam operating arm 67 in position when swung to the right, as viewed in Fig. 6, far enough to permit the reel W to be lifted from the table 1, the sleeve 61 may carry a casing 133 (Figs. 6 and 9) in which is mounted a vertically slidable pin 135, the pin having an operating handle 137, and the construction being that of a familiar type of door bolt in which the casing is provided with upper and lower transverse slots 139 connected by a longitudinal slot (not shown) permitting movement of the handle 137 from adjacent one slot 139 to adjacent the other for holding the pin in raised or lowered position when the pin is turned to move the handle into the transverse slots. When the arm is swung manually to the right the pin 135 may be raised so that it will be in the path of that arm at the left hand side thereof as viewed in Fig. 6, whereupon the handle 137 may be swung into the upper slot 139 to hold the pin in raised position, in which position it will prevent the spring 121 from returning the arm until the pin is again moved into its retracted position shown by Fig. 9.

The reel W, as shown by Figs. 2, 6, 9 and 10, comprises an arbor or body portion 141 of considerable outside diameter, conveniently about ten inches, this arbor for reducing its weight being tubular and preferably of light weight metal such as aluminum or magnesium. As shown, the bore 143 of the arbor is generally square in cross-section and is open at each of opposite ends. Adjacent each end the bore is formed with a pair of opposite slots 145 the uppermost pair of which may receive a crane hook of the so-called "ice-tong" type for lifting the reel from the table 1 when it is charged with strip, the square cross-section of the bore facilitating application of such hook and the maintaining of it in proper relation to the reel. At each end the arbor of the reel is recessed to form a flange 147, in which recesses are received the inner edge portions of the annular disks or reel end plates 149, preferably of aluminum or magnesium. As shown, these annular end plates at their outer peripheries are circular and at their inner peripheries present openings 151 (Fig. 6) which fit the outer walls of the flanges 147. As shown, the end plates are secured to the arbor 141 of the reel by screws 153, and, if desired, may be further secured by welding the walls of their openings 151 to the flanges 147, as indicated at 155 (Fig. 9).

For detachably securing the reel to the table 1 the instrument shown by Figs. 6 to 13 may be employed. As shown, this instrument, which is preferably formed of light weight material such as aluminum or magnesium, comprises an elongated tubular body portion 157 carrying a handle 159 at its upper end, preferably secured thereto by welding as indicated at 161 (Fig. 12). At its lower end it is shown as carrying the four radially extending sheet metal vanes 163 secured thereto by welding as indicated at 165 (Fig. 11), these vanes being reinforced by sheet metal strips 167 welded at opposite ends thereof to the vanes as indicated at 169 (Figs. 7 and 12). Carried by the lower end of the tubular body portion 157 is a head 171 which, as shown, is square in cross-section. This head has a reduced diameter shank 173 received within and fitting the bore 175 of the tubular body portion 157 (see Fig. 8), those portions 177 of the head which project beyond the outer surface of the tubular body portion being welded to the latter as indicated at 179 (Fig. 13).

By use of the handle 159 the instrument may be inserted into and withdrawn from the bore of the reel arbor after either end of the reel is placed upon the table, the outer edge portions of the vanes 163 being received in longitudinal slots 181 formed throughout the extent of the bore 143 at its corners so as rotatively to connect the instrument to the reel. The table 1 at its upper side is formed with a coaxial opening 183 (Fig. 9) which is square in cross-section and receives the similarly shaped head 171 of the instrument so as to connect the latter to the table. Thus when the instrument is so inserted the reel is detachably secured to the table and is forced to rotate with it.

It will be understood that within the scope of the appended claim wide deviations may be made from the forms of the invention described without departing from the spirit of the invention.

I claim:

Reeling mechanism for moving a strip longitudinally and winding it into a coil comprising a substantially constant speed electric driving motor and a fluid transmission driven by said motor for so moving and so winding the strip; the fluid transmission having a control member for varying its output speed whereby to vary the angular speed at which the strip is wound into a coil; mechanism adapted to be operated by the coil being wound for operating said control member comprising a swinging arm operatively adapted to contact with the outer surface of the coil and to be swung by such contact as the diameter of the coil increases, said mechanism also comprising a plurality of cams each mounted at a different distance from a common axis of rotation and also means for causing said cams to be rotated about said axis by the swinging of said arm, said mechanism further comprising a cam follower adapted to cooperate with any of said cams for causing that cam to operate said control member as said cam is rotated by swinging of said arm, each cam being shaped to cause said control member progressively to decrease the output speed of said transmission for causing the strip to move longitudinally at a substantially constant speed; and means for adjustably positioning, angularly relative to said arm, each of said cams to the exclusion of the others into cooperating relation with said cam follower whereby the strip may be moved longitudinally at any of a plurality of predetermined substantially constant speeds.

JOHN FRENCH.

REFERENCES CITED

The following references are of record in the file of this patent:

UNITED STATES PATENTS

| Number | Name | Date |
|---|---|---|
| 620,332 | Kustner | Feb. 28, 1899 |
| 890,252 | Thompson | June 9, 1908 |
| 1,122,878 | Dowler | Dec. 29, 1914 |
| 1,652,299 | Carpenter | Dec. 13, 1927 |
| 1,822,495 | Laycock | Sept. 8, 1931 |
| 1,925,580 | Anderson | Sept. 5, 1933 |
| 2,164,600 | Tyler | July 4, 1939 |
| 2,190,529 | Bretschneider | Feb. 13, 1940 |
| 2,192,778 | Stacy | Mar. 5, 1940 |
| 2,202,563 | Mikaelson | May 28, 1940 |
| 2,217,966 | Perkins | Oct. 15, 1940 |
| 2,278,136 | Otis et al. | Mar. 3, 1942 |
| 2,351,264 | Harrington et al. | June 13, 1944 |
| 2,363,585 | Grosser | Nov. 28, 1944 |
| 2,416,860 | Waldie | Mar. 4, 1947 |
| 2,431,159 | Bates | Nov. 18, 1947 |

OTHER REFERENCES

Booklet: "Reeves Automatic Production Control" #T-361, pages 1 and 3. Received in Div. 61, March 5, 1936. (Copy in 242-75.1.)